May 21, 1963 — H. A. BERLINER — 3,090,292
VENTILATING DEVICE
Filed Feb. 24, 1961 — 2 Sheets-Sheet 1
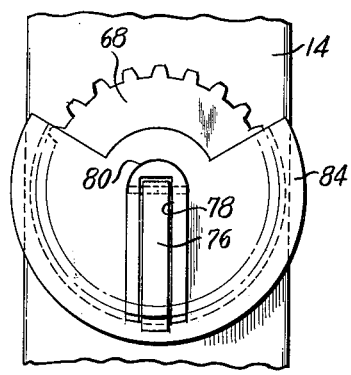
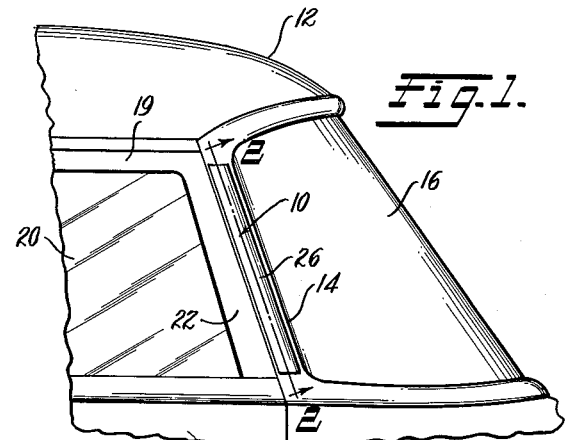
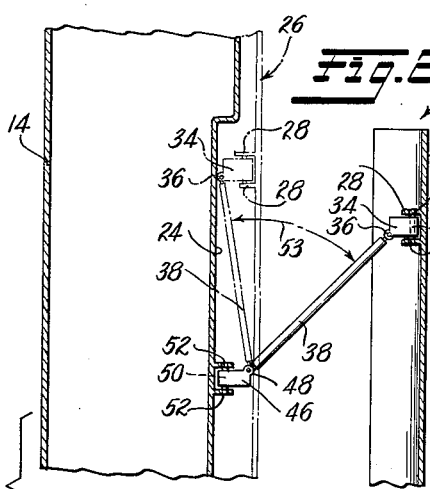
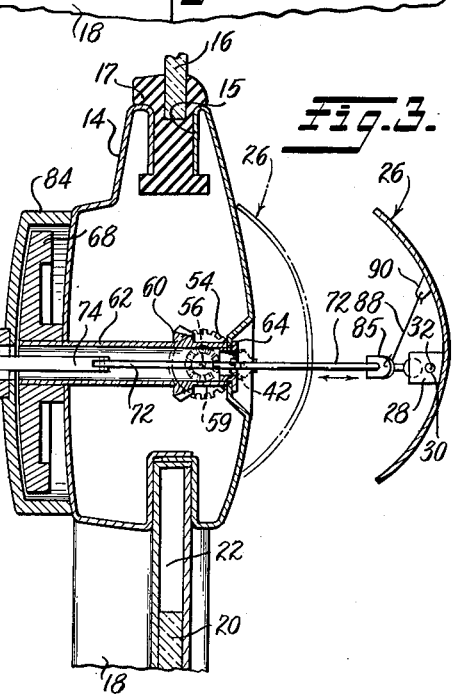
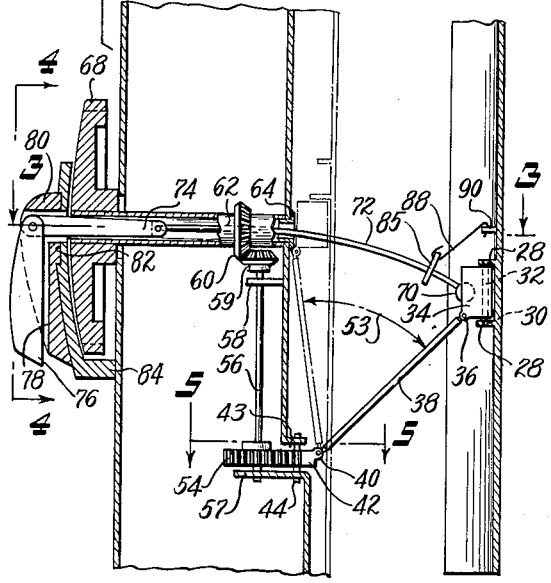
INVENTOR.
Henry A. Berliner
BY Bacon & Thomas
ATTORNEYS May 21, 1963  H. A. BERLINER  3,090,292
VENTILATING DEVICE
Filed Feb. 24, 1961  2 Sheets-Sheet 2
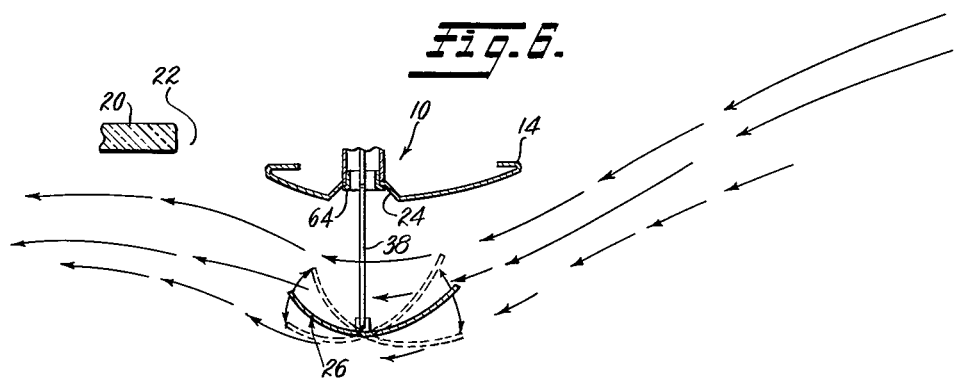
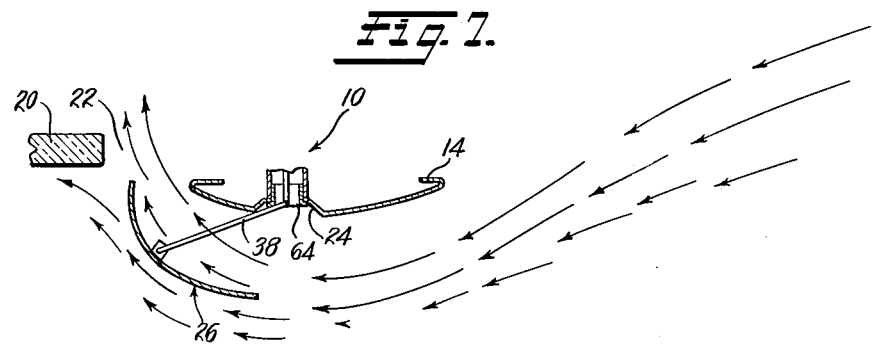
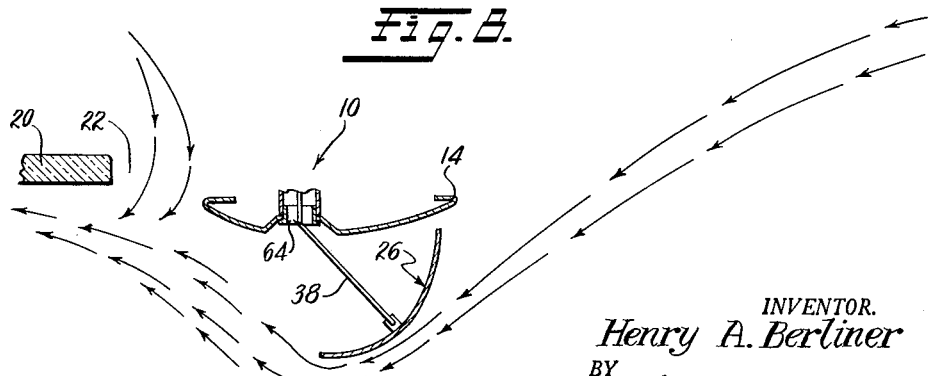
INVENTOR.
Henry A. Berliner
BY
Bacon & Thomas
ATTORNEYS United States Patent Office 3,090,292
Patented May 21, 1963

3,090,292
VENTILATING DEVICE
Henry A. Berliner, 2841 Tilden St. NW.,
Washington, D.C.
Filed Feb. 24, 1961, Ser. No. 91,350
16 Claims. (Cl. 98—2)

This invention relates to a novel air intake and exhaust device for vehicles, and more specifically to a novel air deflector adapted to be mounted on the forward, intermediate, and/or rear roof-supporting post of a vehicle and selectively adjusted to different positions to create the desired type of ventilation.

Most present-day automobiles are equipped with vent windows, which comprise small supplementary panes, each mounted forwardly or rearwardly of the respective main windows on either side of the vehicle. These vent windows, for example, may be positioned immediately forward of the respective front-door main windows and pivotally mounted for rotation about a vertical axis, whereby they may be disposed at selected angles relative to the flow of passing air to deflect air into the vehicle body, or to exhaust air therefrom. Similar vent windows are often provided at the rear of the rear-door main windows, either in the door or rearwardly of the roof support column.

While such vent windows do perform a ventilating function, they present a number of disadvantages. Primarily, their ventilating function is rather limited, since their longitudinal and transverse positions cannot be adjusted. Further, it is well-known that when this type of deflector is used in rainy weather the rain water tends to migrate along its outer surface into the interior of the vehicle, and even when it is shut there is a difficult sealing problem. Finally, this conventional type of air deflector affords a convenient way for gaining unauthorized entry into the automobile when it is locked.

It is an object of the present invention, therefore, to provide a novel air deflector for vehicle ventilation which obviates the above disadvantages, and which may be conveniently adjusted within a wide range of angles and positions, possibly by control means within the vehicle, to achieve various ventilating functions.

Another object is to provide a novel air deflector, which is movable (1) from an inconspicuous and unobstructing position against a vehicle body to an operative position spaced a desired distance outwardly therefrom, and which may then be independently adjusted (2) forwardly or rearwardly and (3) angularly about a vertical axis.

A still further object is to provide a novel air deflector which can be installed on vehicles of conventional design, particularly on those having main front-door windows with angular forward edges.

A related object is to provide a novel air deflector which may be installed in vehicles of contemporary design and construction without any major changes in the styling or structural arrangement.

Another object is to provide a novel vehicle ventilator which is simple and inexpensive compared with conventional devices and which incorporates a positive and effective control mechanism.

Another object is to provide an air deflector for vehicles which does not obstruct the driver's vision or that of his passengers.

It is also an object to provide a vehicle ventilator construction and control mechanism which is sturdily constructed, readily installed, and easy to repair or replace if damaged.

Other objects and advantages will become apparent from a consideration of the following description and the attached drawings.

FIG. 1 is a fragmentary side elevation of a vehicle incorporating a novel ventilating device constructed in accordance with the principles of the present invention;

FIG. 2 is an enlarged sectional view taken on the line 2—2 of FIG. 1;

FIG. 3 is a fragmentary sectional view taken on the line 3—3 of FIG. 2;

FIG. 4 is a fragmentary side elevation taken on the line 4—4 of FIG. 2;

FIG. 5 is an enlarged fragmentary sectional view taken on the line 5—5 of FIG. 2; and FIGS. 6, 7, and 8 are vertical sections similar to FIG. 3 but in diagrammatic form to illustrate various air current patterns achieved by the present ventilating device in different positions of adjustment.

Referring now more specifically to the drawings, the novel ventilating device is generally designated in FIG. 1 by the numeral 10 and is shown mounted on one of the forward roof-supporting columns 14 of a vehicle body 12. The adjacent side edge of a windshield 16 is received in a slot or channel 15 provided in the forward edge of the support column 14 and secured by weather-sealing means such as a sealing strip 17.

The vehicle body 12 includes a conventional front door 18 having an opening 19 adapted to receive a conventional window 20. As shown, opening 19 and window 20 have inclined forward edges and the window is adapted to be rolled down vertically into the body of door 18, in the conventional manner. Thus, in a partially open position, as illustrated, an open space 22 is provided along the entire rear edge of column 14. In some instances the operating mechanism for window 20 produces an initial horizontal movement to the rear, thus forming the elongated opening 22 before the window is moved downwardly.

The support column 14 is provided with a vertically extending, elongated channel 24 to accommodate the operating connections for a baffle 26. The baffle 26 comprises an elongated sheet member with its forward and rear portions curved inwardly from a point to the rear of its central vertical axis to provide an outwardly convex configuration, generally arcuate in section (FIG. 3).

The baffle 26 is provided with two aligned pairs of spaced parallel lugs 28 projecting from the inner surface thereof, each having apertures 30 for receiving hinge pins 32. Hinge pins 32 pivotally secure the outer ends of connecting members 34 between the respective pairs of spaced lugs 28. At the inner end of each member 34 is provided a pair of spaced perforated ears 36, pivotally mounting one end of a link 38.

The other end of the lower link is pivotally mounted between a similar pair of spaced perforated ears 40 carried at the inner end of a sector gear 42. The gear 42 is disposed in a plane normal to column 14 and pivotally mounted in a slot 43 at the lower end of channel 24, as by a pin 44.

The inner end of the upper link 38 is pivotally supported on a hinge member 46 between a pair of spaced perforated ears 48 at the outer edge thereof. The inner end of hinge 46 is pivotally secured to column 14 by a pin 50 passing through vertically aligned apertures in a pair of spaced lugs 52. The lugs 62 project outwardly from the bottom wall of the channel 24 at a point spaced from the upper end thereof by a distance greater than the length of the upper link 38. The axis of the hinge pin 50 is aligned with the axis of the pin 44, and thus the links 38 can be swung forwardly or rearwardly about the aligned axes, moving the baffle 26 forwardly or rearwardly in an arcuate path. The parallel linkage 38—38 also permits the baffle 26 to be swung upwardly into the position illustrated in phantom lines in FIG. 2, with the linkage recessed in channel 24. The latter movement is illustrated by the arrows 53 and serves to move the baffle 26 between an operative position spaced from column 14 and an inoperative position fitting snugly against the outer surface of column 14.

A sector gear 54 is fixed on a shaft 56 immediately above a flange 57 extending inwardly into column 14 from the bottom of channel 24. The gear 54 is arranged to mesh with gear 42 to transmit rotary motion thereto to the extent permitted by the respecive sectors of gear teeth. The shaft 56 has its lower end received in an opening in flange 57 and its upper end extends through an aligned opening in a lug 58 which projects inwardly from the bottom wall of channel 24, and terminates in a bevel gear 59. Gear 59 meshes with a gear 60 mounted adjacent the outer end of a horizontally disposed, inwardly extending hollow shaft 62. The outer end of the shaft 62 is journaled in an opening in the bottom wall of channel 24. The inner end of the shaft extends through an opening in the inner wall of column 14 and carries an operating knob or wheel 68. It will be readily understood that rotation of the knob 68 will rotate shaft 62, bevel gears 60 and 59, shaft 56 and sector gears 54 and 42 to swing the baffle 26 forwardly or rearwardly in the manner described.

As best illustrated in FIGS. 2 and 3, the inner end 70 of a resilient operating rod 72 is in the shape of a ball and is received in a socket formed in the inner wall of lower member 34, above ears 36. The other end of the rod 72 extends through bearing 64 and hollow shaft 62 and is pivotally connected at one end of a link 74. The other end of the link 74 pivotally mounts a lever 76. The lever 76, when in its depending position as shown in FIGS. 2 and 4, is received within a slot 78 in a knob 80, the knob being in turn rotatably supported in a recess 82 provided on the inner wall of a fixed housing member 84. Housing 84 covers all but the upper portion of knob 68 and is secured to the inner wall of column 14 by any suitable means.

The resilient rod 72, adjacent the inner end 70, is provided with a bell-crank arm or lever 85, which is pivotally connected, by a link 88, with a lug 90 on the baffle 26, disposed forwardly of and slightly above the lower member 34, as best illustrated in FIGS. 2 and 3.

When it is desired to retract the baffle 26, the operator grasps the lever 76 and pulls it inwardly, which movement is effective to cause pivoting of the baffle 26 about the links 38 to its inoperative position, as previously described. The link 74 is dimensioned so that it is entirely withdrawn through casing 84 when the baffle 26 is in its inoperative position, and can be pivoted downwardly into the slots 78 to lock the baffle in this position. When the baffle 26 is in its outer position rotation of the knob 80 will turn levers 76 and 74, rotating the rod 72 and its crank arm 85, to thereby pivot baffle 26 through link 88. The pivotal movement thus takes place about the axes of hinge pins 32 and serves to cock the baffle 26 at a desired angle with respect to the flow of passing air.

As seen in phantom lines in FIG. 3, the baffle 26 has a contour which fits neatly against the outer wall surface of column 14 so that, in its retracted position, the baffle is maintained flush with the column 14, presenting a pleasing appearance and providing a surface which does not interfere with the normal flow of air over the surface of the body. It will also be observed that, when in the retracted position shown in phantom lines in FIG. 3, the baffle 26 completely covers and protects the operating connections within the channel 24, and lies in a position that does not interfere with the vision of a person within the vehicle.

When it is desired to ventilate the body of the vehicle, the lever 76 can be swung into a horizontal position aligned with the bore of hollow shaft 62, and moved outwardly to locate the baffle 26 in operative position. At this point, the lever 76 occupies the slot 78 in knob 64, so that rotation of the knob will effect the desired angular adjustment of baffle 26. Rotation of knob 68 will, in the manner previously described, move the baffle in an arcuate path, generally forwardly and rearwardly with respect to column 14.

It is important that the apparatus described herein be provided with means for frictionally holding or locking the relatively movable parts in adjusted position because of the pressure of air bearing against the baffle. Any conventional means may be employed, such as knurling the abutting surfaces of the hinge elements or providing them with radial serrations (not shown).

FIGS. 6, 7 and 8 illustrate schematically various positions of the baffle 26 which obtain ventilation of varying types within the vehicle body. In these figures, the arrows indicate the directions of the flow of passing air, the vehicle being pictured as moving from left to right, and a narrow slot or opening 22 is provided between the support post 14 and the window 20. FIG. 6 illustrates the links 38 extending directly outward from the channel 24 and shows, in broken lines, several different positions to which the baffle may be pivoted about an adjacent vertical axis. As shown in solid lines, the baffle 26 is substantially parallel with the outer surface of the post 14, forming between the baffle and the post, a passage of substantially constant cross section. The air passes through this passage and over the opening 22, producing no pressure difference across the opening, and consequently no substantial flow of air into or out of the vehicle body. By oscillating the baffle 26, as shown in broken lines, it is possible to vary the air flow over the opening 22 to produce an inflow of air or an exhaust. If the baffle is tilted to the position in which the downstream edge is moved toward the post, some of the air will be deflected through the opening 22, and if tilted in the other direction, so that the upstream edge is brought near the post 14, a low pressure area will be created outside the opening 22, which will tend to exhaust some of the air from the interior of the vehicle.

FIG. 7 illustrates the latter function more clearly. Here the links 38 have been swung in a downstream or rearward direction, whereby the air is scooped or funneled into opening 22, as shown by the arrows, thus producing a maximum intake of air. FIG. 8 illustrates an adjusted position in which the links 38 have been swung in an upstream direction, which brings the leading edge of the baffle into a position adjacent the post 14, and the trailing edge in spaced relation to said post. The air is therefore deflected, as shown by the arrows, creating a low-pressure zone immediately downstream of the baffle 26, which is effective to exhaust air from the vehicle as indicated by the arrows passing through the opening 22. It is to be understood that the baffle 26 can be pivoted about the ends of links 38 when in the positions shown in FIGS. 7 and 8, in the same manner as shown in broken lines in FIG. 6, to obtain varying degrees of ventilation.

While the control means disclosed and the specific configuration of the air baffle is deemed desirable it should be recognized that numerous other embodiments may be employed. For example, it is specifically contemplated that one or more of the movements may be controlled by hand or by a different remote-control means. Numerous other modifications of this nature may be made without departing from the spirit of the invention or the scope of the annexed claims.

I claim:

1. A deflector adapted to direct air through an opening in an enclosure, comprising: a baffle positioned adjacent said opening; pivot means mounting said baffle for pivotal movement about a first axis lying adjacent said baffle; means mounting said baffle on said enclosure for swinging movement about a second axis lying adjacent said mounting means, said second axis being parallel to and spaced from said first axis; and means mounting said baffle about a third axis disposed normal to said second axis for swinging movement laterally of said second axis.

2. A deflector as defined in claim 1, in which said baffle comprises an elongated, outwardly convex member curved along generally upright lines with its inner concave surface connected to said pivot means.

3. A deflector as defined in claim 1, in which said baffle comprises a vertically disposed elongated sheet member having the side edges thereof bowed inwardly toward said opening from a point forward of its central vertical axis and curving inwardly more sharply forwardly of said point than rearwardly thereof.

4. A deflector as defined in claim 1, in which said means mounting said baffle for lateral movement in the direction of said second axis includes a parallelogram linkage system.

5. A deflector as defined in claim 1, including remotely positioned controls connected to said second pivot means and to said baffle to move said baffle between selected positions.

6. In combination with a vehicle having a generally upright column adjacent one edge of a window opening, a ventilator baffle adapted to direct air through said opening positioned in overlying relation on the outer surface of said column for directing air in either direction through said opening, and means mounting said baffle on said column for movement in one direction about an axis adjacent to said baffle directing air into said opening and for movement in the opposite direction directing air out of said opening.

7. The combination defined in claim 6, including means mounting said baffle for lateral movement toward and away from said column.

8. The combination defined in claim 6, wherein said means mounting said baffle provide for swinging movement thereof about a second axis adjacent said column.

9. The combination defined in claim 6, in which said baffle comprises an elongated sheet member of arcuate transverse cross section, means being provided within said vehicle for selectively moving said baffle between retracted position overlying said column and selected positions spaced outwardly therefrom.

10. The combination defined in claim 6, wherein said column is recessed to receive said mounting means when said baffle is in retracted position.

11. The combination defined in claim 6, wherein said opening is provided with a window, the forward edge of which is moveable in a rearward direction relative to said column to leave a narrow space for the passage of air rearwardly of said column.

12. In combination with an automobile having a rearwardly slanted forward roof column, a front door mounted rearwardly of said roof column and having a window opening therein, the forward edge of said window being parallel with said roof column and a window mounted in said window opening for vertical lowering movement, an adjustable air deflector mounted on said column positioned outwardly of said column for cooperation with the current of air therealong and movable with respect to said opening to direct air in either direction through the opening provided along the forward edge of said window upon lowering the same.

13. In combination with a vehicle, an air deflector, means for mounting said air deflector in parallel relation along the outer side wall of a forward roof supporting column, said means including upper and lower parallel arms pivotally connected at their inner ends to said column and pivotally connected at their outer ends to said deflector, whereby said deflector may be selectively moved between open extended position spaced outwardly from said post and retracted position against said post and pivoted on generally upright axes adjacent said column and adjacent said deflector at the inner and outer ends, respectively, of said arms.

14. The combination of claim 13 including a knob positioned on the inner side wall of said column operatively connected with at least one of said arms for pivoting said arm about its inner end in response to rotation of said knob.

15. The combination of claim 13 including an actuating member connected at its outer end to said deflector extending through said column to be operable from within said vehicle to move said deflector between open and retracted position.

16. The combination of claim 15 wherein said actuating member includes a bell crank link to pivot said deflector about the outer ends of said arms in response to rotation of said actuating member applied at the inner end thereof.

References Cited in the file of this patent

UNITED STATES PATENTS

| | | |
|---|---|---|
| 407,859 | Grant | July 30, 1889 |
| 1,019,696 | Peddy | Mar. 5, 1912 |
| 1,555,540 | Wilms | Sept. 29, 1925 |
| 2,337,632 | Winser | Dec. 28, 1943 |
| 2,764,928 | Martinson | Oct. 2, 1956 |

FOREIGN PATENTS

| | | |
|---|---|---|
| 552,064 | Italy | Nov. 26, 1956 |